(12) United States Patent
Wan et al.

(10) Patent No.: US 7,139,486 B2
(45) Date of Patent: Nov. 21, 2006

(54) METHOD AND APPARATUS FOR OPTICAL ADD/DROP MULTIPLEXING IN OPTICAL NETWORKS

(75) Inventors: Ping Wai Wan, Ottawa (CA); Derrick Remedios, Ottawa (CA); Dan Oprea, Ottawa (CA); Patrick Chilufya Chimfwembe, Ottawa (CA)

(73) Assignee: Tropic Networks Inc., Kanata (CA)

( * ) Notice: Subject to any disclaimer, the term of this patent is extended or adjusted under 35 U.S.C. 154(b) by 718 days.

(21) Appl. No.: 10/635,544

(22) Filed: Aug. 7, 2003

(65) Prior Publication Data

US 2004/0109685 A1 Jun. 10, 2004

Related U.S. Application Data

(60) Provisional application No. 60/430,973, filed on Dec. 5, 2002.

(51) Int. Cl.
*H04J 14/02* (2006.01)
(52) U.S. Cl. .............................. 398/97; 398/32; 398/34
(58) Field of Classification Search .................. 398/32, 398/34, 97
See application file for complete search history.

(56) References Cited

U.S. PATENT DOCUMENTS 7,079,764 B1 * 7/2006 Saunders ...................... 398/10

OTHER PUBLICATIONS

Chung, et al, "Effects of Stimulated Raman Scattering on Pilot-Tone Based WDM Supervisory Technique", IEEE Photon. Technical Letter, Vol. 12, pp. 731-733, Jun. 2000.
Hill, et al, "A Transport Network Layer Based on Optical Network Elements", IEEE Journal of Lightwave Technology, vol. 11, No. 5/6, pp. 667-679, May/Jun. 1993.

* cited by examiner

*Primary Examiner*—Leslie Pascal
(74) *Attorney, Agent, or Firm*—Victoria Donnelly

(57) ABSTRACT

An optical add/drop multiplexing (OADM) apparatus and method are disclosed for detecting pilot tones, removing ghost tones, and re-inserting pilot tones on WDM signals in an optical network. The OADM apparatus comprises a smart processing and control unit (PCU) for detecting pilot tones used for channel identifications, including identifying and removing ghost tones associated with respective optical channels, and re-inserting the processed pilot tones into the respective optical channels. The OADM apparatus and method may incorporate digital PCU or analog PCU for processing pilot tones and removing ghost tones.

25 Claims, 4 Drawing Sheets

METHOD AND APPARATUS FOR OPTICAL ADD/DROP MULTIPLEXING IN OPTICAL NETWORKS

RELATED APPLICATION

This application claims benefit from U.S. Provisional Patent Application Ser. No. 60/430,973 to Wan, P. W., et al, entitled "Method and Apparatus for Optical Add/Drop Multiplexing in Optical Networks", filed on Dec. 5, 2002.

FIELD OF THE INVENTION

This invention relates generally to optical telecommunications networks and, in particular, to method and apparatus for optical add/drop multiplexing in optical networks.

BACKGROUND OF THE INVENTION

In a wavelength division multiplexed (WDM) network each node is capable of routing a large volume of traffic around the network without the need for optoelectronic conversion and processing. Fibers entering and leaving the nodes carry multiple optical channels (wavelengths), and within the node, optical channels are routed either to the outgoing fiber or to local units (receiver or transmitter) for channel dropping, adding, and re-routing. The WDM network requires reliable supervisory technique for channel identification and performance monitoring. In particular, for proper management of these networks, it is essential to monitor optical paths of WDM signals in optical add/drop multiplexing and cross-connect nodes.

Pilot tone (dither tone) monitor technique is being used to supervise an individual channel along the optical signal path in the WDM network. At the transmitter, a low frequency pilot tone (dither tone) in the kHz range is modulated onto the signal, each optical channel being coded by a different pilot tone frequency. The pilot tones are extracted at intermediate nodes by tapping off a small portion of the optical signal power into a monitor module, while the main part of the optical signal is routed to the destination nodes. The tapped optical signal is used for channel power measurements and identification via the dither tones encoded on the channel. In this way the dither tones can be monitored at each intermediate node without optically demultiplexing the optical data signals. The signal channel identification and power level information provided by the dither tones is useful for fault management, such as in detecting missing channels or low power channels, and taking corresponding corrective actions.

The pilot tones are allocated in a frequency band low enough not to interfere with the optical data spectrum, but high enough to avoid low frequency crosstalk within EDFAs (Erbium Doped Fiber Amplifiers). Otherwise, these pilot tones would generate ghost tones (crosstalk) due to the slow dynamic properties of EDFAs in the optical network and the transmission length (i.e., number of EDFAs) of the signals in the network. These ghost tones could not only mislead the performance monitoring system, but also cause errors in the monitor techniques using pilot tones for channels identifications.

In an article by Chung et al., "Effects of stimulated Raman Scattering on Pilot-Tone Based WDM Supervisory Technique", IEEE Photon. Technical Letter, Volume 12, pp. 731–733, June 2000, an experimental setup was described including eight WDM signals (optical channels) multiplexed into a single fiber into a single WDM signal transmitted over fiber and eight EDFAs. The first EDFA used a dynamic gain control unit to compensate for the slow dynamic properties of EDFAs. After transmission over fiber for some distance, WDM channels were dropped using add/drop multiplexer (ADM) made of two arrayed-waveguide gratings (AWGs), and the optical spectrum of the WDM signal and electrical spectrum of pilot tones were measured. The ghost tones appeared due to the cross gain modulation of EDFAs. Adjustments were made to the input power of the EDFAs; however, the ghost tones were not removed completely but were suppressed at the output of the first EDFA via the gain control unit.

In an article by Hill et al., "A Transport Network Layer Based on Optical Network Elements", IEEE Journal of Lightwave Technology, Volume 11, No. 5/6, pp. 667–679, May/June 1993, another method for removing ghost tones was described, wherein channel spacing and commercial fiber amplifiers were used to limit ghost tones build up in an optical network. Unfortunately, there are limitations to channel spacing and commercial fiber amplifiers are not reliable in removing ghost tones completely.

Consequently, there is a need in the industry to provide improved method and apparatus for efficiently and reliably removing ghost tones on WDM signals in an optical network.

SUMMARY OF THE INVENTION

It is an object of the present invention to provide improved methods and apparatus for detecting pilot tones, remove ghost tones, and re-insert pilot tones on WDM signals in an optical network.

The invention, therefore, according to one aspect provides an optical add/drop multiplexing (OADM) apparatus comprising a demultiplexer for demultiplexing a WDM input signal into individual optical channels (wavelengths), each channel being marked with a pilot tone for channel identification and monitoring; a smart processing and control unit (PCU) for processing the pilot tones including identifying and removing ghost tones associated with the respective pilot tones and re-inserting the processed pilot tones into the respective optical channels; and a multiplexer for receiving the optical channels with the re-inserted pilot tones and multiplexing said optical channels into a WDM output signal, the demultiplexer and multiplexer being arrayed-waveguide gratings (AWGs).

The OADM apparatus further comprises a plurality of electronically controlled variable optical attenuators (eVOAs), each being inserted into an optical signal path of one of said individual optical channels; a plurality of optical tap couplers following the eVOAs for detecting the optical channel power at the outputs of said eVOAs; and a plurality of optical to electrical (O/E) converters at the inputs to and outputs of said eVOAs for converting the optical signals to electrical signals.

The smart PCU comprises means for measuring frequency spectra at the inputs to and outputs of the eVOAs, and means for comparing and processing said measured frequency spectra. The means for comparing and processing said measured frequency spectra comprises means for processing pilot tones and removing the ghost tones associated with the respective pilot tones.

The means for processing pilot tones comprises means for detecting pilot tones; filtering out electronically the pilot tones; registering the pilot tones and associated optical channels; and re-inserting the processed pilot tones into the respective optical channels.

The means for removing the ghost tones associated with the respective pilot tones comprises means for detecting ghost tones on each of the optical channels; comparing the ghost tones with a pre-determined signal-to-noise ratio (SNR) threshold; generating the ghost tones cancellation tones to cancel ghost tone on each of the optical channels; and modulating the outputs of the eVOAs by applying the ghost tones cancellation tones whenever the ghost tones are greater than the pre-determined SNR threshold.

In accordance with a first embodiment of the present invention, the smart PCU is a digital PCU, wherein the means for measuring the frequency domain spectra at the inputs and outputs of the eVOAs are tone monitors and the means for comparing and processing said measured frequency spectra is a comparator unit. The digital PCU further comprises A/D converters for converting analog electrical signals to digital signals, and D/A converters for converting digital signals to the analog electrical signals.

The comparator unit comprises a comparator for comparing the measured frequency spectra at the inputs and outputs of the eVOAs; a tone generator for generating cancellation tones to cancel the ghost tones on each of the optical channels; and an intensity modulator for removing the ghost tones at the output of the eVOAs by applying the cancellation tones to the respective optical channels.

The tone generator comprises means for filtering and registering the pilot tones from respective optical channels, and the tone modulator comprises means for re-inserting the filtered pilot tones into respective optical channels. The comparator unit further comprises a controller for using the optical channels with the re-inserted pilot tones for controlling attenuations of said eVOAs.

The tone generator further comprises means for detecting ghost tones on each of the optical channels and comparing the ghost tones with a pre-determined signal-to-noise ratio (SNR) threshold. The tone modulator further comprises means for modulating the outputs of the eVOAs by applying the ghost tones cancellation tones.

In accordance with a second embodiment of the present invention, the smart PCU is an analog PCU, wherein the means for measuring the frequency domain spectra at the inputs to and outputs of the eVOAs are monitor circuitries and the means for comparing and processing said measured frequency spectra is a comparator unit.

The comparator unit comprises a comparator for comparing the measured frequency spectra at the inputs and outputs of the eVOAs; a tone generation circuitry for generating cancellation tones to cancel the ghost tones on each of the optical channels; and a tone modulation circuitry for removing the ghost tones at the output of the eVOAs by applying the cancellation tones to the respective optical channels.

The tone generation circuitry comprises means for filtering and registering the pilot tones from respective optical channels; and the tone modulation circuitry comprises means for re-inserting the filtered pilot tones into respective optical channels. The comparator unit further comprising a control circuit for using the optical channels with the re-inserted pilot tones for controlling attenuations of said eVOAs.

The tone generation circuitry further comprises means for detecting ghost tones on each of the optical channels and comparing the ghost tones with a pre-determined signal-to-noise ratio (SNR) threshold. The tone modulation circuitry comprises means for modulating the outputs of the eVOAs by applying the ghost tones cancellation tones.

A further aspect of the invention provides a method for detecting pilot tones, removing ghost tones, and re-inserting pilot tones on WDM signals in an optical network comprising the steps of demultiplexing a WDM input signal into individual optical channels (wavelengths), each channel being marked with a pilot tone; processing the pilot tones including identifying and removing ghost tones associated with the respective pilot tones and re-inserting the processed pilot tones into the respective optical channels; and multiplexing the optical channels received with the re-inserted pilot tones into a WDM output signal. The step of demultiplexing comprises filtering amplified spontaneous emission (ASE) on the individual optical channels (wavelengths).

The step of processing comprises measuring frequency spectra at the inputs and outputs of the eVOAs and comparing and processing said measured frequency spectra.

The step of processing pilot tones comprises detecting pilot tones; filtering out electronically the pilot tones, registering the pilot tones and associated optical channels; and re-inserting the processed pilot tones into the respective optical channels.

The step of removing the ghost tones at the outputs of the eVOAs comprises detecting ghost tones on each of the optical channels; determining if the ghost tones are greater than a pre-determined signal-to-noise ratio (SNR) threshold; generating the ghost tones cancellation tones to cancel ghost tone on each of the channels; and modulating the output of the eVOAs by applying the ghost tones cancellation tones whenever the ghost tones are greater than the pre-determined SNR threshold.

This invention provides an OADM apparatus and method for detecting pilot tones, removing ghost tones, and re-inserting pilot tones on WDM signals in an optical network. This method and apparatus would ensure pilot tone monitor technique integrity, remove ghost tones on WDM signals, and reduce and/or sufficiently reduce side effects of the build up of the ghost tones in the optical network.

The embodiments of the present invention provide an improved method and apparatus for detecting pilot tones, removing ghost tones, and re-inserting pilot tone on WDM signals in an optical network that would overcome the shortcomings and limitations of prior art.

BRIEF DESCRIPTION OF THE DRAWINGS

The invention is better understood from the following description of the preferred embodiments, together with reference to the accompanying drawings, in which.

DESCRIPTION OF THE PREFERRED EMBODIMENTS

Figure 1:
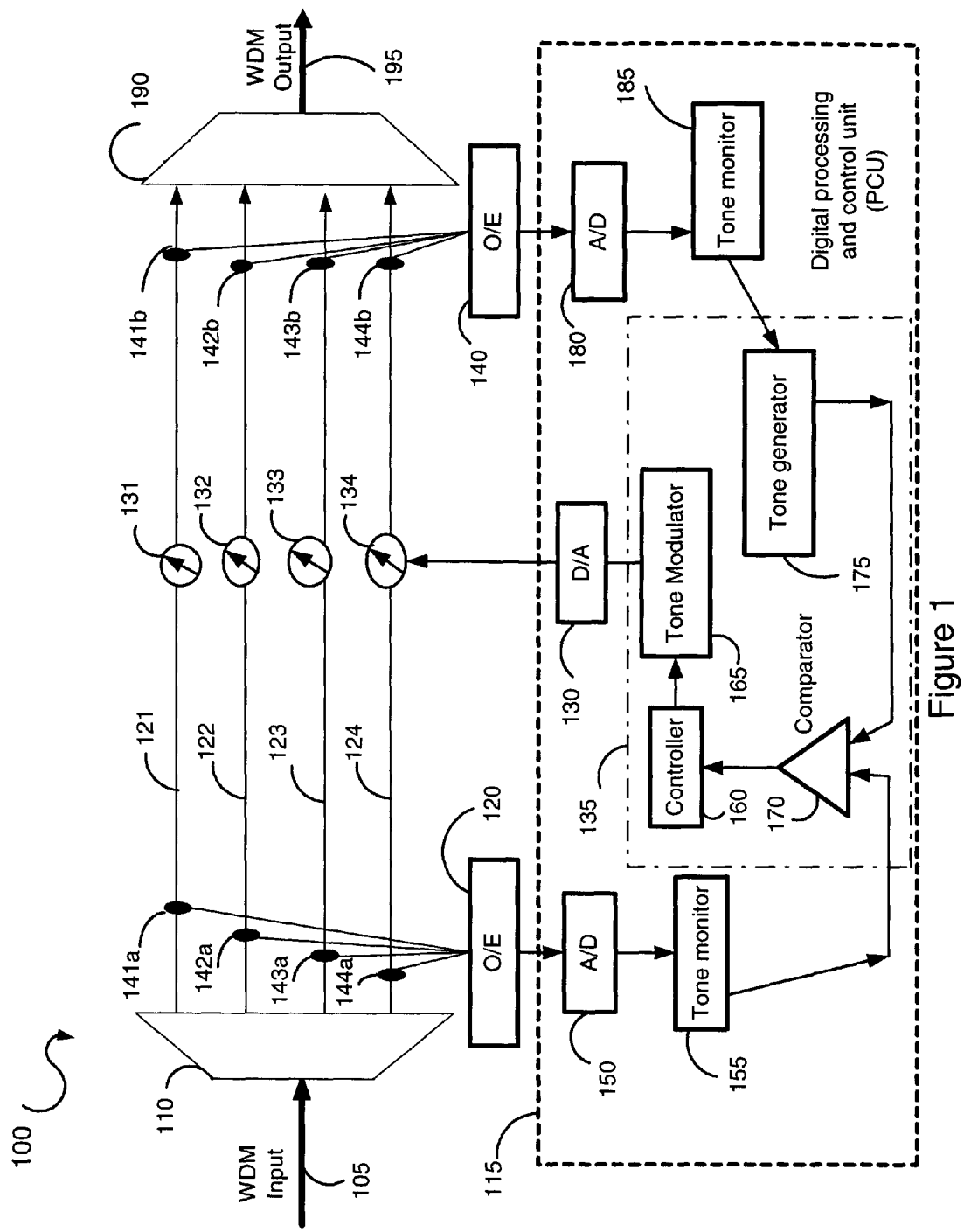
FIG. 1 is a diagram illustrating an OADM apparatus in accordance with an embodiment of the invention.

FIG. 1 shows an OADM apparatus 100 of an embodiment of the invention, wherein a WDM input 105 is fed to a demultiplexer 110, and the de-multiplexed optical channels (wavelengths) 121 to 124 are tapped by a plurality of optical tap couplers 141a, 142a, 143a, 144a, and fed to multiple eVOAs 131 to 134 respectively. The outputs from the eVOAs 131 to 134 are fed to another plurality of optical tap couplers 141b to 144b for detecting the optical signal power at the outputs of said eVOAs 131 to 134 respectively. The eVOAs 131 to 134 and optical tap couplers 141a to 144a, and 141b to 144b are inserted in the paths of the optical signals of the optical channels 121 to 124 respectively. The optical channels 121 to 124 tapped by the optical tap couplers 141a to 144a at the inputs to the eVOAs 131 to 134 are fed to optical to electronic (O/E) converters (shown collectively as) 120 for converting their optical signals to electrical signals. The optical signals of the optical channels 121 to 124 tapped by the optical tap couplers 141b to 144b at the outputs of the eVOAs 131 to 134 are fed to the optical to electrical (O/E) converters (shown collectively as) 140 for converting their optical signals to electrical signals. The signals from the O/E converters 120 and 140 are fed to a smart processing and control unit (PCU) 115, which is a digital PCU in the first embodiment of the invention.

The digital PCU 115 comprises analog to digital (A/D) converters (shown collectively as) 150 and 180 for converting the analog electrical signals received from the O/E converters 120 and 140 to digital signals respectively, and tone monitors 155 and 185 for measuring frequency domain spectra of the digital signals at the inputs to and outputs of the eVOAs 131 to 134 respectively. The digital PCU 115 comprises a comparator unit 135 for comparing and processing the measured frequency spectra at the inputs to and outputs of the eVOAs 131 to 134. The digital PCU 115 further comprises digital to analog (D/A) converters (shown collectively as) 130 for converting the digital signals to analog signals for controlling attenuations of the eVOAs 131 to 134.

The comparator unit 135 comprises a comparator 170 for comparing the measured frequency spectra at the inputs to and outputs of the eVOAs 131 to 134; a tone generator 175 for generating cancellation tones to cancel the ghost tones on each of the optical channels; and a tone modulator 165 for removing the ghost tones on each of the optical channels by applying the cancellation tones. The tone generator 175 further comprises means for filtering and registering pilot tones from respective optical channels, and the tone modulator 165 comprises means for re-inserting the processed pilot tones into the respective optical channels. The comparator unit 135 further comprises a controller 160 for using the optical channels with the re-inserted pilot tones for controlling attenuations of said eVOAs.

The tone generator 175 further comprises means for detecting ghost tones on each of the optical channels 121 to 124, and means for determining if the ghost tones are greater than a pre-determined signal-to-noise ratio (SNR) threshold. The tone modulator 165 comprises means for modulating the outputs of the eVOAs 131 to 134 by applying the ghost tones cancellation tones whenever the ghost tones are greater than the pre-determined SNR threshold. The modulated output optical channels 121 to 124 from the eVOAs 131 to 134 are then multiplexed by a multiplexer 190 to form the WDM output 195.

Figure 2:
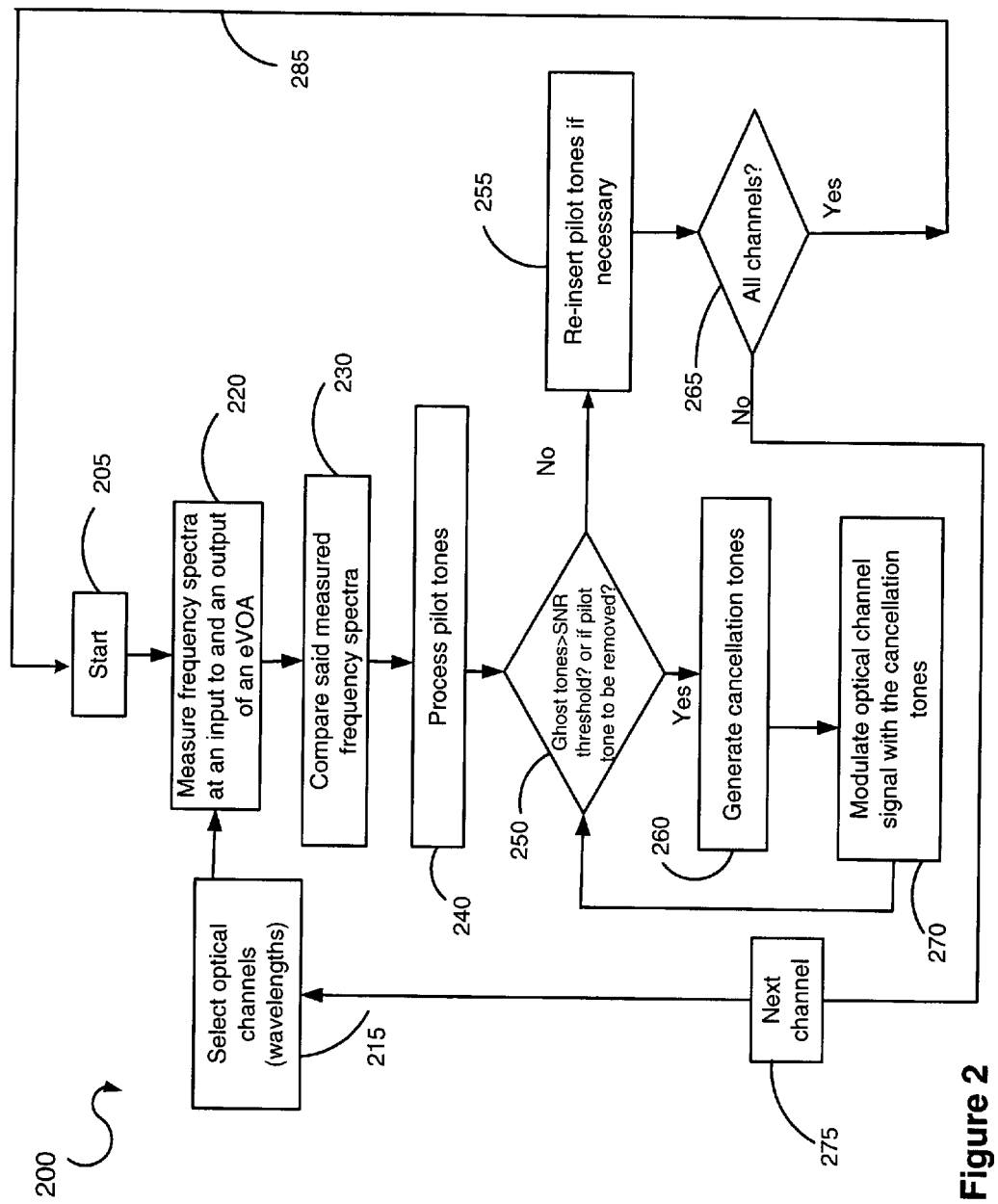
FIG. 2 is a flow chart diagram illustrating a method for detecting pilot tones, removing ghost tones, and re-inserting pilot tones in the OADM of FIG. 1.

FIG. 2 shows a flow chart diagram 200 illustrating a method for detecting pilot tones, removing ghost tones, and re-inserting pilot tones on WDM signals for the OADM of FIG. 1, wherein upon start up (block 205) procedure 200 measures the frequency spectra of the optical signal at an input to and an output of one of the eVOAs 131 to 134 (block 220). The optical channels (block 215) are the de-multiplexed optical channels 121 to 124 of the WDM input 105 of the OADM 100 of FIG. 1. Procedure 200 compares said measured frequency spectra (block 230) for processing pilot tones (block 240) on each of the optical channels, wherein processing pilot tones comprises steps of detecting pilot tones, filtering out electronically the pilot tones, and registering the pilot tones and respective optical channels.

Procedure 200 determines if the ghost tones on the optical channel are greater than a pre-determined signal-to-noise ratio (SNR) threshold (block 250) and if the pilot tone is required to be removed. If the ghost tones on the optical channel are greater than a pre-determined signal-to-noise ratio (SNR) threshold, procedure 200 generates ghost tones cancellation tones to cancel the ghost tone on the optical channel (block 260). Procedure 200 modulates the optical channels at the outputs of the eVOAs by applying the ghost tones cancellation tones (block 270) whenever the ghost tones are greater than the pre-determined SNR threshold. Procedure 200 uses the modulated digital signals for controlling attenuations of said eVOAs 131 to 134 and checks again for ghost tones (block 250).

If the ghost tones on the optical channel are equal to or less than a pre-determined SNR threshold (block 250) or if the pilot tone has to be re-inserted, the procedure 200 re-inserts pilot tone into the respective optical channel (block 255). Procedure 200 cycles through all channels (block 275) until all optical channels are processed (exit "Yes" from block 265), and then repeating the entire the procedure 200 (routine 285).

Figure 3:
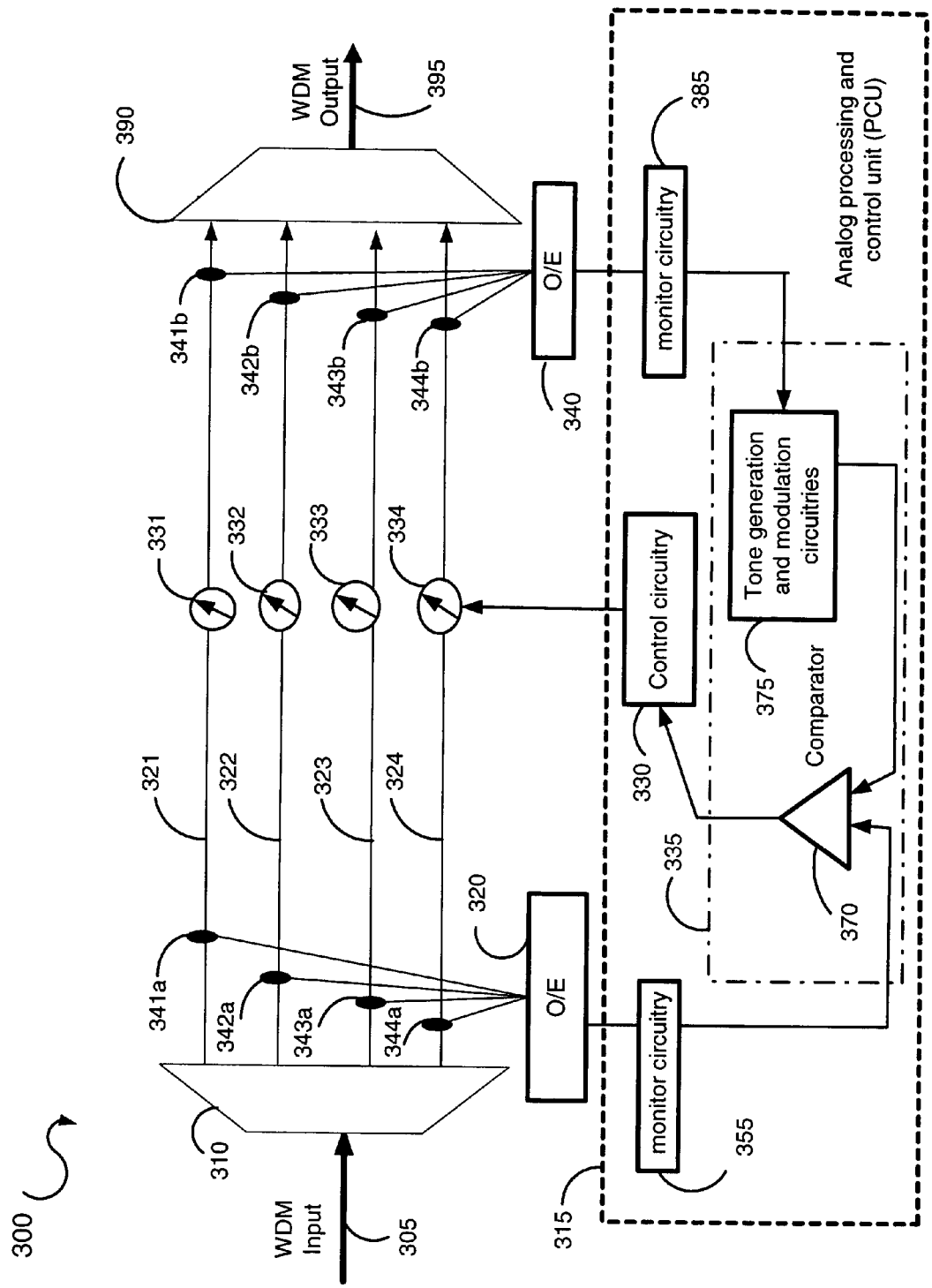
FIG. 3 is a diagram illustrating an OADM apparatus in accordance with another embodiment of the invention.

FIG. 3 shows an OADM apparatus 300 in accordance with another embodiment of the invention, wherein a WDM input 305 is fed to a demultiplexer 310, and the de-multiplexed optical channels (wavelengths) 321 to 324 are fed to multiple eVOAs 331 to 334, respectively. The optical channels 321 to 324 at the inputs to the eVOAs are tapped by a plurality of optical tap couplers 341a to 344a respectively, and the optical channels at the outputs from the eVOAs 331 to 334 are fed to another plurality of optical tap couplers 341b to 344b for detecting the optical signal power at the outputs of said eVOAs 331 to 334 respectively. The eVOAs 331 to 334 and optical tap couplers 341a to 344a and 341b to 344b are inserted in the paths of the optical signals of the optical channels 321 to 324. The tapped optical channels 321 to 324 at the inputs to the eVOAs 331 to 334 are fed to optical to electronic (O/E) converters (shown collectively as) 320 for converting their optical signals to electrical signals. The tapped optical signals 321 to 324 at the outputs of the eVOAs 331 to 334 are fed to the optical to electrical (O/E) converters (shown collectively as) 340 for converting their optical signals to electrical signals. The signals from the O/E converters 320 and 340 are fed to a smart processing and control unit (PCU) 315, which is an analog PCU in this embodiment.

The analog PCU 315 comprises monitor circuitries 355 and 385 for measuring the frequency domain spectra of the electrical signals at the inputs to and outputs of the eVOAs 331 to 334, respectively. The analog PCU 315 further comprises a comparator unit 335 for comparing and processing the measured frequency spectra at the inputs to and outputs of the eVOAs 331 to 334. The analog PCU further comprises a control circuit 330 for using the optical channels with the re-inserted pilot tones for controlling attenuations of said eVOAs 331 to 334.

The comparator unit 335 comprises a comparator 370 for comparing the measured frequency spectra at the inputs to and outputs of the eVOAs 331 to 334; tone generation and modulation circuitries (shown collectively as) 375, wherein the tone generation circuitry is for generating cancellation tones to cancel the ghost tones on each of the optical channels; and the tone modulation circuitry is for removing the ghost tones on each of the optical channels by applying the cancellation tones. The tone generation circuitry further comprises means for filtering and registering pilot tones from respective optical channels, and the tone modulation circuitry comprises means for re-inserting the processed pilot tones into the respective optical channels.

The tone generations circuitry further comprises means for detecting ghost tones on each of the optical channels, and means for determining if the ghost tones are greater than a pre-determined signal-to-noise ratio (SNR) threshold. The tone modulation circuitry comprises means for modulating the outputs of the eVOAs 331 to 334 by applying the ghost tones cancellation tones whenever the ghost tones are greater than the pre-determined SNR threshold. The modulated output optical channels 321 to 324 from the eVOAs 331 to 334 are then multiplexed by a multiplexer 390 to form the WDM output 395.

Figure 4:
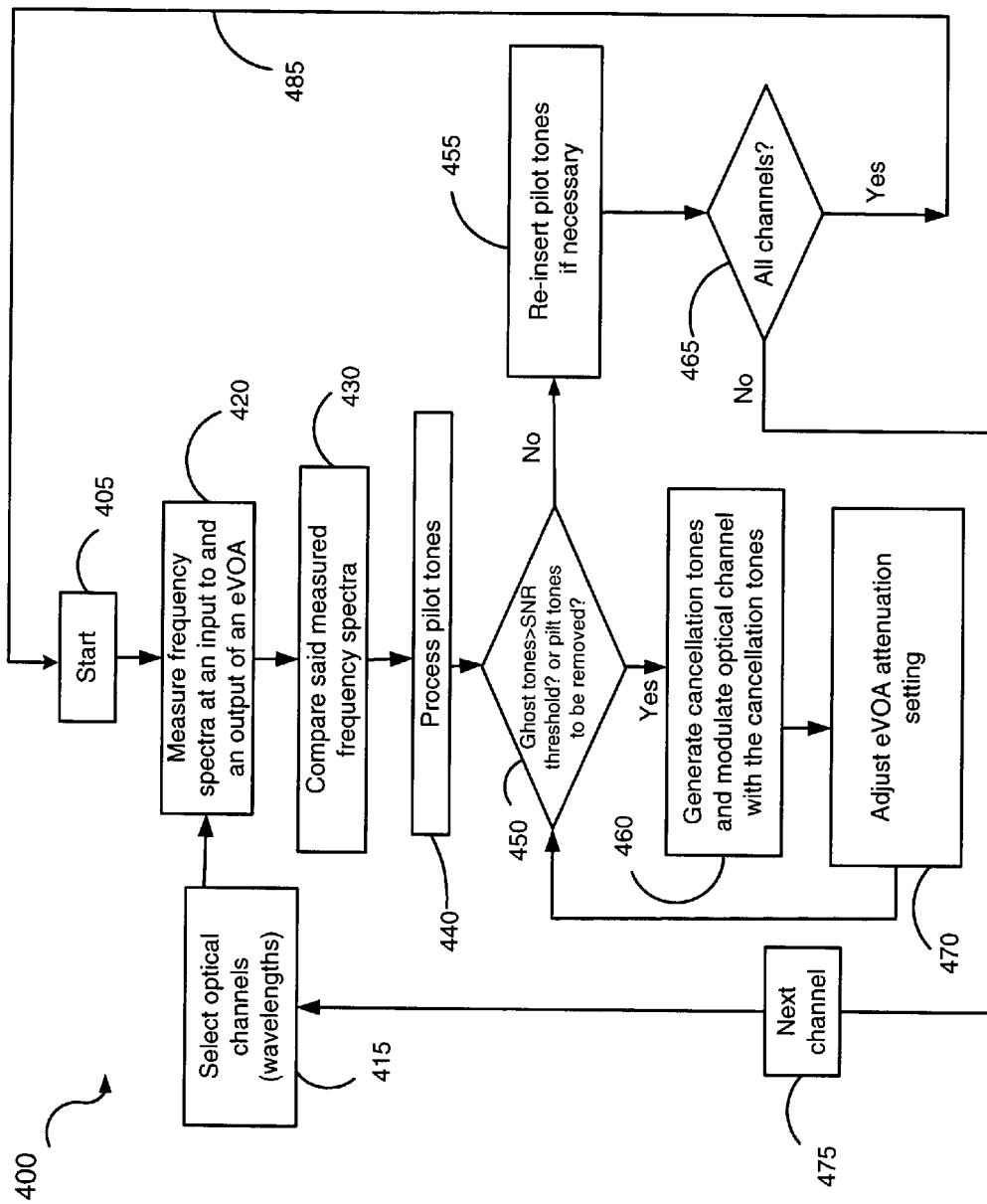
FIG. 4 is a flow chart diagram illustrating a method for detecting pilot tones, removing ghost tones, and re-inserting pilot tones in the OADM of FIG. 2.

FIG. 4 shows a flow chart diagram 400 illustrating a method for detecting pilot tones, removing ghost tones, and re-inserting pilot tones on WDM signals for the OADM of FIG. 3, wherein upon start up (block 405) procedure 400 measures the frequency spectra of the optical signal at an input to and an output of one of the eVOAs 331 to 334 (block 420). The optical channels (wavelengths) (block 415) are the de-multiplexed optical channels 321 to 324 of the WDM input 305 of the OADM 300 of FIG. 3. Procedure 400 compares said measured frequency spectra (block 430) for processing pilot tones (block 440) on each of said optical channels, wherein processing pilot tones comprises steps of detecting pilot tones; filtering out electronically the pilot tones, and registering the pilot tones and respective optical channels.

Procedure 400 determines if the ghost tones on the optical channel are greater than a pre-determined signal-to-noise ratio (SNR) threshold and if the pilot tones need to be removed (block 450). If the ghost tones on the optical channel are greater than a pre-determined signal-to-noise ratio (SNR) threshold, procedure 400 generates ghost tones cancellation tones to cancel the ghost tone on the optical channel and modulates the optical channels at the outputs of the eVOAs by applying the ghost tones cancellation tones (block 460) whenever the ghost tones are greater than the pre-determined SNR threshold. Procedure 400 uses the modulated analog signals for controlling attenuations of said eVOAs 331 to 334 (block 470) and checks again for ghost tones (block 450).

If the ghost tones on the optical channel are equal to or less than a pre-determined SNR threshold (block 450), procedure 400 re-inserts pilot tones into the respective optical channels if necessary. Procedure 400 cycles through all channels (block 475) until all optical channels are processed (block 465), and then the procedure 400 is repeated again (routine 485).

Appreciably, incorporating the OADM apparatus and method of the embodiments of the present invention on WDM nodes would remove ghost tones and/or sufficiently reduce side effects associated with build up of ghost tones in the optical networks. The embodiments of this invention ensure the integrity of pilot tones and reliability of pilot tone monitor techniques for channels identifications and performance monitoring.

Thus, the embodiments of the invention provide an improved method and apparatus for detecting pilot tones, removing ghost tones, and re-inserting pilot tones on WDM signals in an optical network. It will be apparent to those with skill in the art that modifications to the above methods and embodiments can occur without deviating from the scope of the present invention. Accordingly, the disclosures and descriptions herein are intended to be illustrative of, but not limiting, the scope of the invention which is set forth in the following claims.

What is claimed is:

1. An optical add/drop multiplexing (OADM) apparatus comprising:
   a demultiplexer for demultiplexing a WDM input signal into individual optical channels (wavelengths), each channel being marked with a pilot tone for channel identification and monitoring;
   a smart processing and control unit (PCU) for processing the pilot tones including identifying and removing ghost tones associated with the respective pilot tones, and re-inserting the processed pilot tones into the respective optical channels; and
   a multiplexer for receiving the optical channels with the re-inserted pilot tones and multiplexing said optical channels into a WDM output signal.

2. An OADM apparatus as described in claim 1, further comprising:
   a plurality of electronically controlled variable optical attenuators (eVOAs), each being inserted into an optical signal path of one of said individual optical channels;
   a plurality of optical tap couplers following the eVOAs for detecting the optical channel power at the outputs of said eVOAs; and
   a plurality of optical to electrical (O/E) converters at the inputs to and outputs of said eVOAs for converting the optical signals to electrical signals.

3. An OADM apparatus as described in claim 1, wherein the smart PCU comprises means for measuring frequency spectra at the inputs to and outputs of the eVOAs; and means for comparing and processing said measured frequency spectra.

4. An OADM apparatus as described in claim 3, wherein the means for comparing and processing said measured frequency spectra comprises means for processing pilot tones and removing the ghost tones associated with the respective pilot tones.

5. An OADM apparatus as described in claim 4, wherein the means for processing pilot tones comprises means for detecting pilot tones; filtering out electronically the pilot tones; registering the pilot tones and associated optical channels; and re-inserting the processed pilot tones into the respective optical channels.

6. An OADM apparatus as described in claim 4, wherein the means for removing the ghost tones associated with the respective pilot tones comprises means for detecting ghost tones on each of the optical channels; comparing the ghost tones are with a pre-determined signal-to-noise ratio (SNR) threshold; generating the ghost tones cancellation tones to cancel ghost tone on each of the optical channels; and modulating the outputs of the eVOAs by applying the ghost tones cancellation tones.

7. An OADM apparatus as described in claim 3, wherein the smart PCU is a digital PCU.

8. An OADM apparatus as described in claim 7, wherein the means for measuring the frequency domain spectra at the inputs to and outputs of the eVOAs are tone monitors.

9. An OADM apparatus as described in claim 7, wherein the means for comparing and processing said measured frequency spectra is a comparator unit.

10. An OADM apparatus as described in claim 9, wherein the comparator unit comprises:

a comparator for comparing the measured frequency spectra at the inputs to and outputs of the eVOAs;

a tone generator for generating cancellation tones to cancel the ghost tones on each of the optical channels; and a tone modulator for removing the ghost tones at the output of the eVOAs by applying the cancellation tones to the respective optical channels.

11. An OADM apparatus as described in claim 10, wherein the tone generator comprises means for filtering and registering the pilot tones from respective optical channels; and the tone modulator comprises means for re-inserting the filtered pilot tones into respective optical channels; the comparator unit further comprising a controller for using the optical channels with the re-inserted pilot tones for controlling attenuations of said eVOAs.

12. An OADM apparatus as described in claim 10, wherein the tone generator further comprises means for detecting ghost tones on each of the optical channels and comparing the ghost tones with a pre-determined signal-to-noise ratio (SNR) threshold; and the tone modulator comprises means for modulating the outputs of the eVOAs by applying the ghost tones cancellation tones.

13. An OADM apparatus as described in claim 7, wherein the digital PCU further comprises A/D converters for converting analog electrical signals to digital signals; and D/A converters for converting digital signals to the analog electrical signals.

14. An OADM apparatus as described in claim 3, wherein the smart PCU is an analog PCU.

15. An OADM apparatus as described in claim 14, wherein the means for measuring the frequency domain spectra at the inputs to and outputs of the eVOAs are monitor circuitries.

16. An OADM apparatus as described in claim 14, wherein the means for comparing and processing said measured frequency spectra is a comparator unit.

17. An OADM apparatus as described in claim 16, wherein the comparator unit comprises:

a comparator for comparing the measured frequency spectra at the inputs to and outputs of the eVOAs;

a tone generation circuitry for generating cancellation tones to cancel the ghost tones on each of the optical channels; and a tone modulation circuitry for removing the ghost tones at the output of the eVOAs by applying the cancellation tones to the respective optical channels.

18. An OADM apparatus as described in claim 17, wherein the tone generation circuitry comprises means for filtering and registering the pilot tones from respective optical channels; and the tone modulation circuitry comprises means for re-inserting the filtered pilot tones into respective optical channels; the comparator unit further comprising a control circuit for using the optical channels with the re-inserted pilot tones for controlling attenuations of said eVOAs.

19. An OADM apparatus as described in claim 17, wherein the tone generation circuitry further comprises means for detecting ghost tones on each of the optical channels and comparing the ghost tones with a pre-determined signal-to-noise ratio (SNR) threshold; and the tone modulation circuitry comprises means for modulating the outputs of the eVOAs by applying the ghost tones cancellation tones.

20. An OADM apparatus as described in claim 1, wherein the demultiplexer and multiplexer are arrayed-waveguide gratings (AWGs).

21. A method for detecting pilot tones, removing ghost tones, and re-inserting pilot tones on WDM signals in an optical network, the method comprising the steps of:

demultiplexing a WDM input signal into individual optical channels (wavelengths), each channel being marked with a pilot tone;

processing the pilot tones including identifying and removing ghost tones associated with the respective pilot tones, and re-inserting the processed pilot tones into the respective optical channels; and multiplexing the optical channels received with the re-inserted pilot tones into a WDM output signal.

22. A method as described in claim 21, wherein the step of processing comprises measuring frequency spectra at the inputs to and outputs of the eVOAs; and comparing and processing said measured frequency spectra.

23. A method as described in claim 22, wherein the step of processing pilot tones comprises detecting pilot tones; filtering out electronically the pilot tones, registering the pilot tones and associated optical channels; and re-inserting the processed pilot tones into the respective optical channels.

24. A method as described in claim 22, wherein the step of removing the ghost tones at the outputs of the eVOAs comprises:

detecting ghost tones on each of the optical channels;

determining if the ghost tones are greater than a pre-determined signal-to-noise ratio (SNR) threshold;

generating the ghost tones cancellation tones to cancel ghost tone on each of the channels; and modulating the output of the eVOAs by applying the ghost tones cancellation tones whenever the ghost tones are greater than the pre-determined SNR threshold.

25. A method as described in claim 21, wherein the step of demultiplexing comprises filtering amplified spontaneous emission (ASE) on the individual optical channels.

* * * * *